(12) United States Patent
Thompson, III

(10) Patent No.: US 9,045,073 B2
(45) Date of Patent: Jun. 2, 2015

(54) VEHICLE ALERT DEVICE FOR VELOCITY AND STOP DETECTION

(71) Applicant: William Harrison Thompson, III, Philadelphia, PA (US)

(72) Inventor: William Harrison Thompson, III, Philadelphia, PA (US)

( * ) Notice: Subject to any disclaimer, the term of this patent is extended or adjusted under 35 U.S.C. 154(b) by 134 days.

(21) Appl. No.: 13/647,409

(22) Filed: Oct. 9, 2012

(65) Prior Publication Data

US 2014/0097949 A1 Apr. 10, 2014

(51) Int. Cl.
*G08G 1/00* (2006.01)
*B60Q 9/00* (2006.01)
*G08G 1/0962* (2006.01)

(52) U.S. Cl.
CPC .............. *B60Q 9/00* (2013.01); *G08G 1/0962* (2013.01); *G08G 1/09626* (2013.01)

(58) Field of Classification Search
CPC .......... G08G 1/0962; G08G 1/09626
USPC ........................ 340/438, 439, 425.5
See application file for complete search history.

(56) References Cited

U.S. PATENT DOCUMENTS

| | | | | |
|---|---|---|---|---|
| 5,285,430 | A * | 2/1994 | Decker | 368/281 |
| 5,402,109 | A * | 3/1995 | Mannik | 340/575 |
| 6,243,008 | B1 * | 6/2001 | Korabiak | 340/463 |
| 2003/0014176 | A1 * | 1/2003 | Levine | 701/70 |
| 2010/0332266 | A1 * | 12/2010 | Tamir et al. | 705/4 |
| 2011/0254655 | A1 * | 10/2011 | Maalouf et al. | 340/3.1 |
| 2012/0064865 | A1 * | 3/2012 | Choi et al. | 455/414.1 |

* cited by examiner

*Primary Examiner* — Andrew Bee

(57) ABSTRACT

An electronic device employed in vehicles, such as automobiles, to ascertain whether the vehicle has stopped at a stop point, such as a stop sign. The operation of the alert device is that it monitors the status of the vehicle's speed or wheel sensor (that it is outputting or not) and if a minimum pulse rate is present, then the vehicle is in motion. A further conclusion can be reasoned is that if there has been no pulse activity over a finite period of time that the vehicle is stopped. The alert device monitors a pulse derived voltage to determine that the vehicle has fully stopped. When the device has detected that the vehicle has come to a full stop an approximately one second tone or chime, and or a visual annunciation is generated and if enabled declare that the vehicle has come to a stop. The alert device also signals when vehicle motion initially occurs by a different tone and flash. The alert device automatically resets for the next stop or initial vehicle movement notification. The alert device facilitates compliance with the law.

17 Claims, 6 Drawing Sheets

US 9,045,073 B2

VEHICLE ALERT DEVICE FOR VELOCITY AND STOP DETECTION

This Application claims the benefit of U.S. Provisional Application Ser. No. 61/627,898, filed Oct. 20, 2011, the contents of which are herein incorporated by reference.

BACKGROUND OF THE INVENTION

1. Field of the Invention

The present invention is related to the field of vehicles. In particular the present invention is directed to the field of alert systems used with motor vehicles.

2. Description of the Related Technology

Since the inception of traffic laws compliance has always been an issue. Traffic laws cover a vast area of motor vehicle operation such as: stop, no turns, no left turn, no right turn, no turn on red. Additional traffic regulations affect minimum and maximum speeds, weather condition related limits, yield, parking, etc. Valuable law enforcement resources are expended to enforce these regulations.

One of the most common law infractions is making an incomplete stop, otherwise known as a "rolling stop." Often the perpetrator of the "rolling stop" claims that a stop has been made, despite not having come to a full stop.

An aspect of the present device is to indicate to the motorist with an alert that the vehicle has started in motion and also when the operator has braked to a complete stop, this is especially important when the motorist is being observed by law enforcement.

SUMMARY OF THE INVENTION

An object of the present invention is system and method for detecting when a vehicle stops or begins motion.

Another object of the invention is an alert device for detecting when a vehicle stops or begins motion.

An aspect of the present invention may be an alert device for vehicles comprising: a sensor for detecting movement of a vehicle; and an annunciator operably connected to the sensor, wherein the annunciator produces an alert detectable to an operator of the vehicle.

Another aspect of the present invention may be an alert system comprising: a vehicle; and an alert device, wherein the alert device comprises; a sensor for detecting movement of the vehicle; and an annunciator operably connected to the sensor, wherein the annunciator produces an alert detectable to an operator of the vehicle.

Still yet another aspect of the present invention is a method for alerting drivers of a complete stop comprising: detecting cessation of vehicle movement; and an annunciator operably connected to the sensor, wherein the annunciator produces an alert detectable to an operator of the vehicle.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

The present alert device 100 is preferably for use in automobiles and related ground vehicles. Operation of the alert device 100 is as follows. At vehicle start-up, the alert device 100 is quiescent. The alert device 100 monitors vehicle speed activity. Once vehicle motion is detected the alert device 100 may alert the driver by an annunciator flash and/or an audible tone. The alert device 100 may also store activation information.

When a vehicle's speed sensor 5 activity ceases, a logical AND function compares the past vehicle in motion status with the present vehicle is stopped indication and may generate a trigger that initiates the flashing of a annunciator lamp and audible signal.

The alert device 100 may then return to quiescence. The advantage of the alert device 100 is that at times motorists are subject to make an error in judgment or might be challenged by distractions so that a full stop at a traffic intersection does not occur. This is commonly referred to as a "rolling stop."

The alert device 100 represents a mechanism by which the operator of a motor vehicle is notified when motion starts, and when it has subsequently stopped moving. The alerts provided by the alert device 100 are a function of an audible tone annunciator and a flash annunciator for each function. These devices may be either separate or combined. It should be understood that the alert device 100 is also operable by itself.

Finally, the alert device 100 is a means by which motorists are relieved from the burden of trying to perceive and having to divert their attention from driving to determine a simple fact: when has this vehicle decelerated to the point that constitutes a stop.

The alert device 100 facilitates getting the driver's attention by indicating when vehicle motion occurs. The alert device 100 further helps a driver determine the point at which a legal stop of a vehicle has occurred. The alert device 100 provides information that the stop was complete and that extra time was not spent waiting after a perceived stop was made. When the alert device 100 signals stopped, it means that the stop has already been completed and it is permissible to now move. Operators of the vehicle now receive confirmation of their stop by either auditory or visual confirmation. It is also possible to provide a tactile alert, such as a vibration etc.

Figure 1:
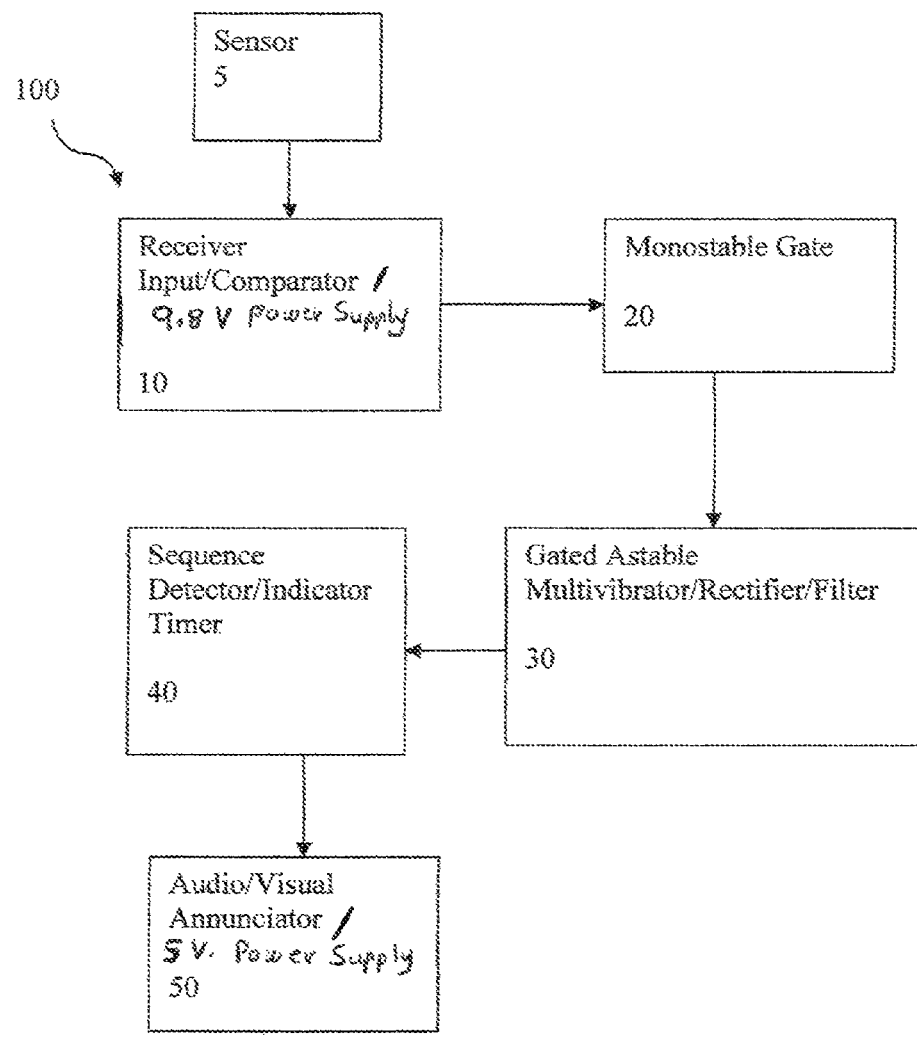
FIG. 1 shows a block diagram showing the circuitry of an alert device, in accordance with an embodiment of the present invention.

Referring now to the drawings, wherein like reference numerals designate corresponding structure throughout the views and turning in particular to FIG. 1. FIG. 1 is a high level block diagram of the alert device 100, made in accordance with an embodiment of the present invention. Sensor 5 measures and provides positioning data to the receiver input/ comparator/power supply 10. In the embodiment described herein the sensor 5 is a Hall effect sensor. The sensor 5 output represents a current draw from the sensor 5 from one of two different ranges. The particular current range is dependent on the proximity of the sensor 5 to the nearest tooth of a steel-toothed disc mounted to rotate concurrent with a wheel of the vehicle.

Figure 2:
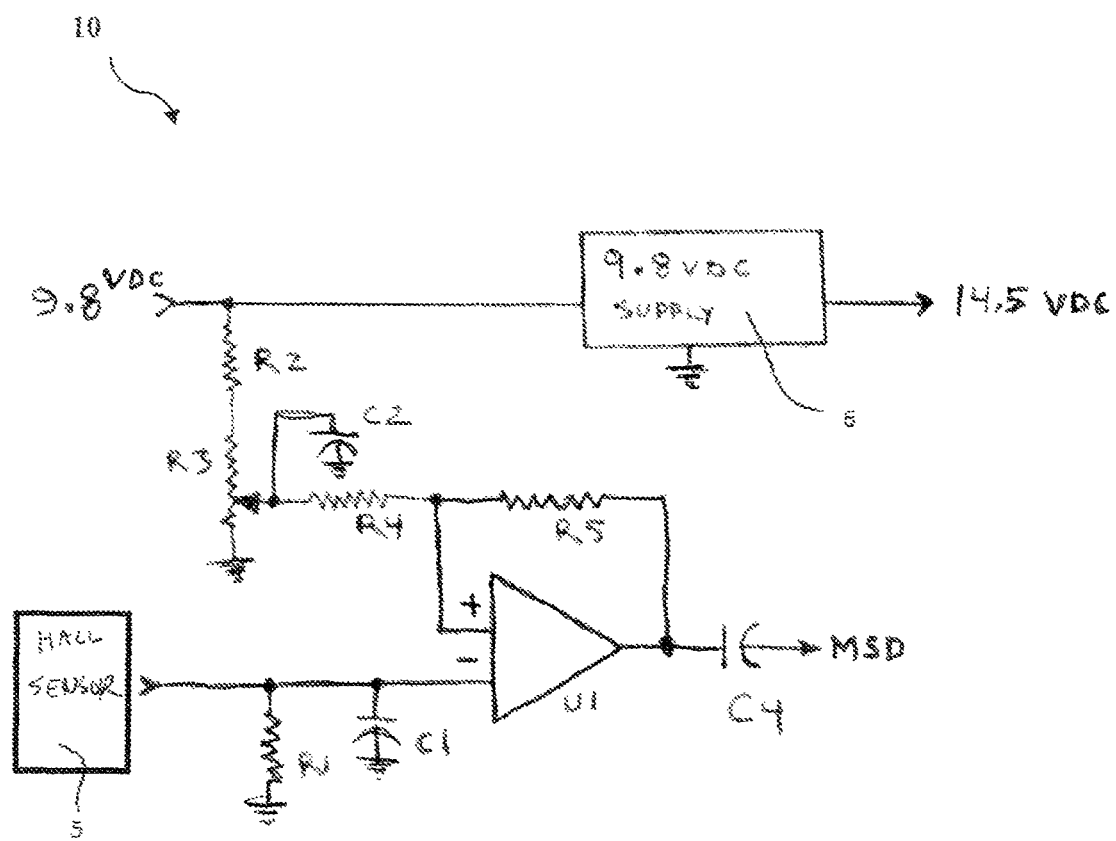
FIG. 2 shows a diagram of the electrical circuitry of a receiver input/comparator/power supply, in accordance with an embodiment of the present invention.

Now referring to FIG. 2, FIG. 2 shows the circuitry of the receiver input/comparator/power supply 10 in detail. The circuit receives positioning data from an external device; the device in the embodiment shown is sensor 5. The receiver input/comparator/power supply 10 in the present invention has a power supply 6 that is 9.8 volts. The power supply 6 is the source of the positive potential of the sensor 5.

Current sensing resistors R1 and C1 are connected to the inverting input of comparator U1. C1 serves to bypass AC noise, the other end of R1 and C1 are grounded, completing the sensors current path.

The positive input of comparator U1 is connected through R4 to the wiper of R3. Voltage divider R2 and R3 connect from the invention's 9.8V power supply 6 to ground. The wiper 3 is adjusted to supply the bias voltage for the comparator which is set at ½ the voltage between the low and high current range readings of the sensor 5. One end of resistor R5 connects to the output of the comparator. The other end of the resistor R5 connects to the positive input of the comparator to supply positive feedback for circuit transition switching stability. The comparator's output is also connected to one end of capacitor C4. Returning to the inverting input of comparator U1, if there is no vehicle movement then there will be a steady state voltage at the input and the comparator output will also be at a steady high or low.

Figure 3:
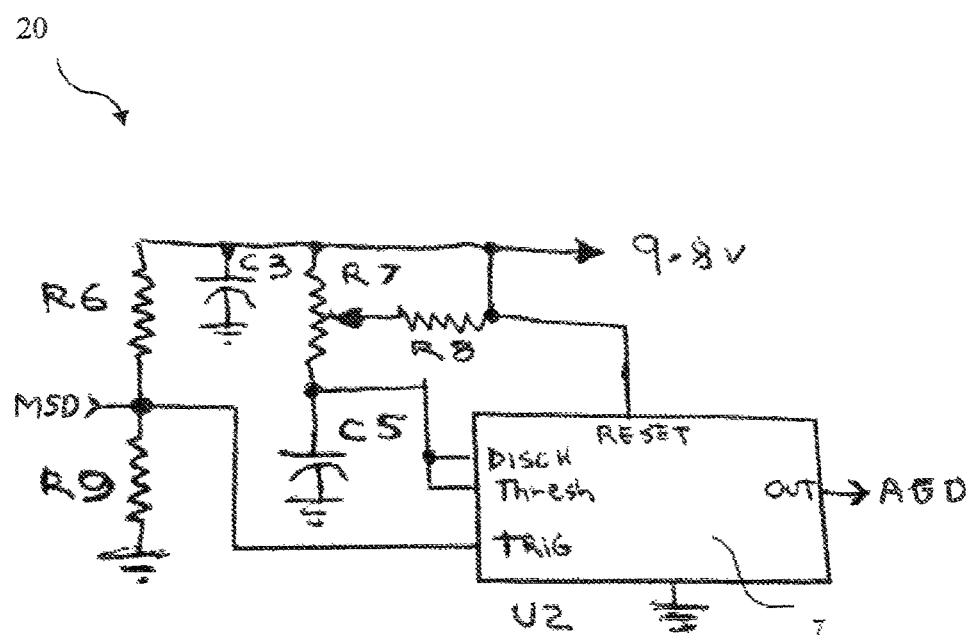
FIG. 3 shows a diagram of the electrical circuitry of a monostable gate, in accordance with an embodiment of the present invention.

Turning to FIG. 3, the circuitry details of the monostable gate 20 is shown. A timer 7, which is a type "555" timer in the present embodiment, is used at U2 to generate an enabling gate for the circuit shown in FIG. 4. The voltage divider R6, R7 sets the trigger input of the timer 7 at U2 at approximately 46% of Vcc.

When the comparator goes low, C4 discharges signal MSD through R6/R9. When the voltage decreases to less than 33% of Vcc, the timer 7 at U2 is triggered and its output signal, AGD, goes high. When the voltage at C5 rises to 66% of Vcc, the timer 7 at U2 resets until C4 discharges again. The duration of the pulse from the timer 7 at U2 is adjustable by the rotation of the wiper of R7.

Figure 4:
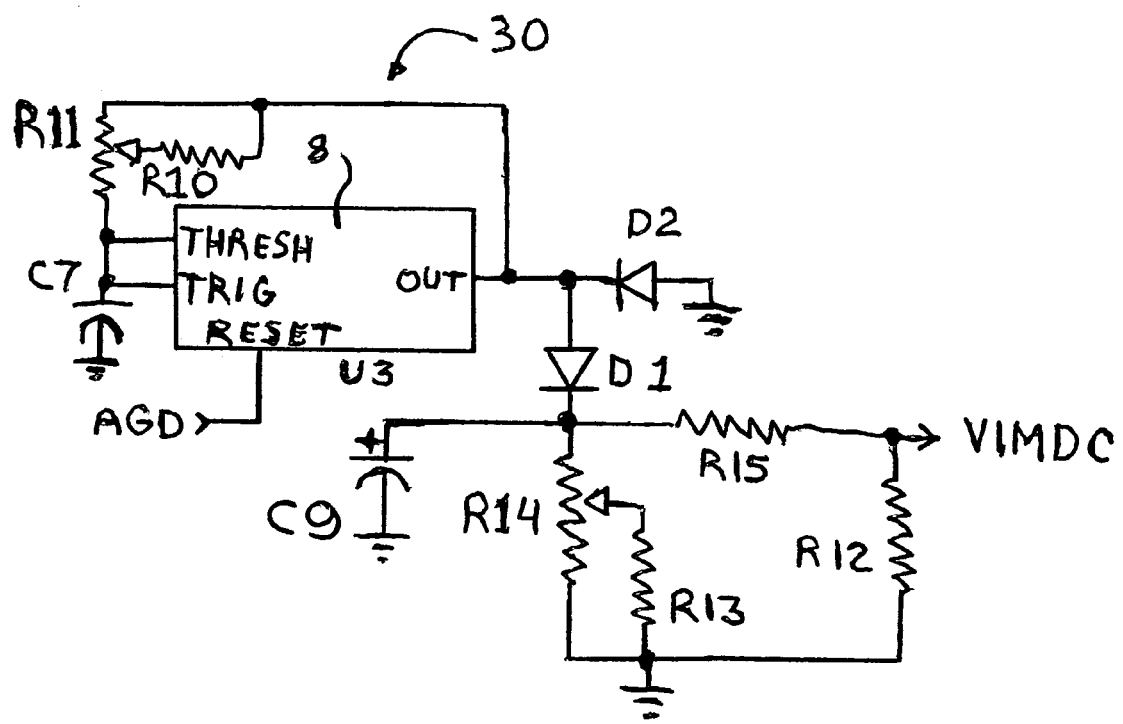
FIG. 4 shows a diagram of the electrical circuitry of a gated astable multivibrator/rectifier filter, in accordance with an embodiment of the present invention.

Now referring to FIG. 4, a schematic of the circuit of the gated astable multivibrator/rectifier/filter 30 is shown. Operation of the circuit is as follows. Timer 8 shown at U3 is a type "555" timer. The timer 8 is configured to operate in the astable mode. When the output of timer 7 which connects to U3's reset input is high, U3 will generate a 50% duty cycle square wave. The frequency of the square wave is a function of R11 and C7. While the vehicle is in motion at all but the most inconsequential of velocity rates, the comparator output will be meaningfully active.

Continuing with the function of the circuitry of the gated astable multivibrator/rectifier/filter 30 in FIG. 4. C8, a 10 uf capacitor is connected to U3, the negative end of the component is tied to the junction of D1 anode and D2 cathode. D2 functions to discharge C8 during the time while the output of U3 is low. D1 serves to charge C9 through C8 while the output of U3 is high. One discharge path for C9 is potentiometer R14 and R13. R13 which is connected to R14's wiper provides an adjustment means. Primarily the C9, R13/R14 relationship represents the discharge time value indicating the point at which the vehicle has stopped. The D.C. output of the circuit is applied to voltage divider R12,R15 and is tapped at 5.0 volts at the junction of R12/R15 to generate signal VIMDC (Vehicle In Motion DC).

After power-up the device will self stabilize, and is ready to operate. Now referring to FIG. 5, the circuitry of the sequence detector/indicator timer 40 is shown. Sequence detector/indicator timer 40 functions in the following manner. Signal VIMDC is received from the gated astable multivibrator/rectifier/filter 30 shown in FIG. 4. When the vehicle is stopped the voltage will be zero. When the vehicle is in motion the voltage will be approximately 5.0 volts. Operation of the circuit of the detector/indicator timer 40 when quiescent is as follows: The voltage is zero, therefore the output of U4-A is high. The fanout of the inverter connects to one input of NAND gate U6-A, the input of inverter U4-C and one end of resistor R16, the other end of R16 connects to one end of C10 and the input of inverter U4-B.

The time constant of integrator R16/C10 is approximately 1.5 μs and serves to establish the period of time that both inputs of NAND gate U4-B are high, which in the embodiment shown, is when vehicle motion first occurs thereby causing its output to go low at the trigger input of U8, initiating vehicle in motion output signal GO as a high from U8, a type "555" timer.

The output of U4-B is connected to the clock input of "D" Flip-Flop U5-A. When voltage VIMDC goes high, indicating that the vehicle is in motion, U4-B will after an approximately 1.5 μs delay switch to a high level. The "D" input of U5-A is grounded, thus when the clock positive transition occurs the quiescent low output of Q NOT will switch and latch high, said output is connected to the remaining input of U6-A, note that other input of U6-A had previously switched low, maintaining the output of U6-A high.

Continuing on, the vehicle has now come to a stop and signal VIMDC has transitioned from approx. 5.0 volts to zero volts. Because the input of inverter U4-A is now at zero volts, its output is at a logical high. NAND gate U6-A now has both of its inputs at a high level. Thus the output of the gate goes low. Moving on to U7, timer 9 is shown, which in this embodiment is a type "555" timer, whose trigger input is connected to the output of U6-A. The low signal level from U6-A causes the timer 9 output, signal Stop Indicator Output, SIO to go high.

Figure 5:
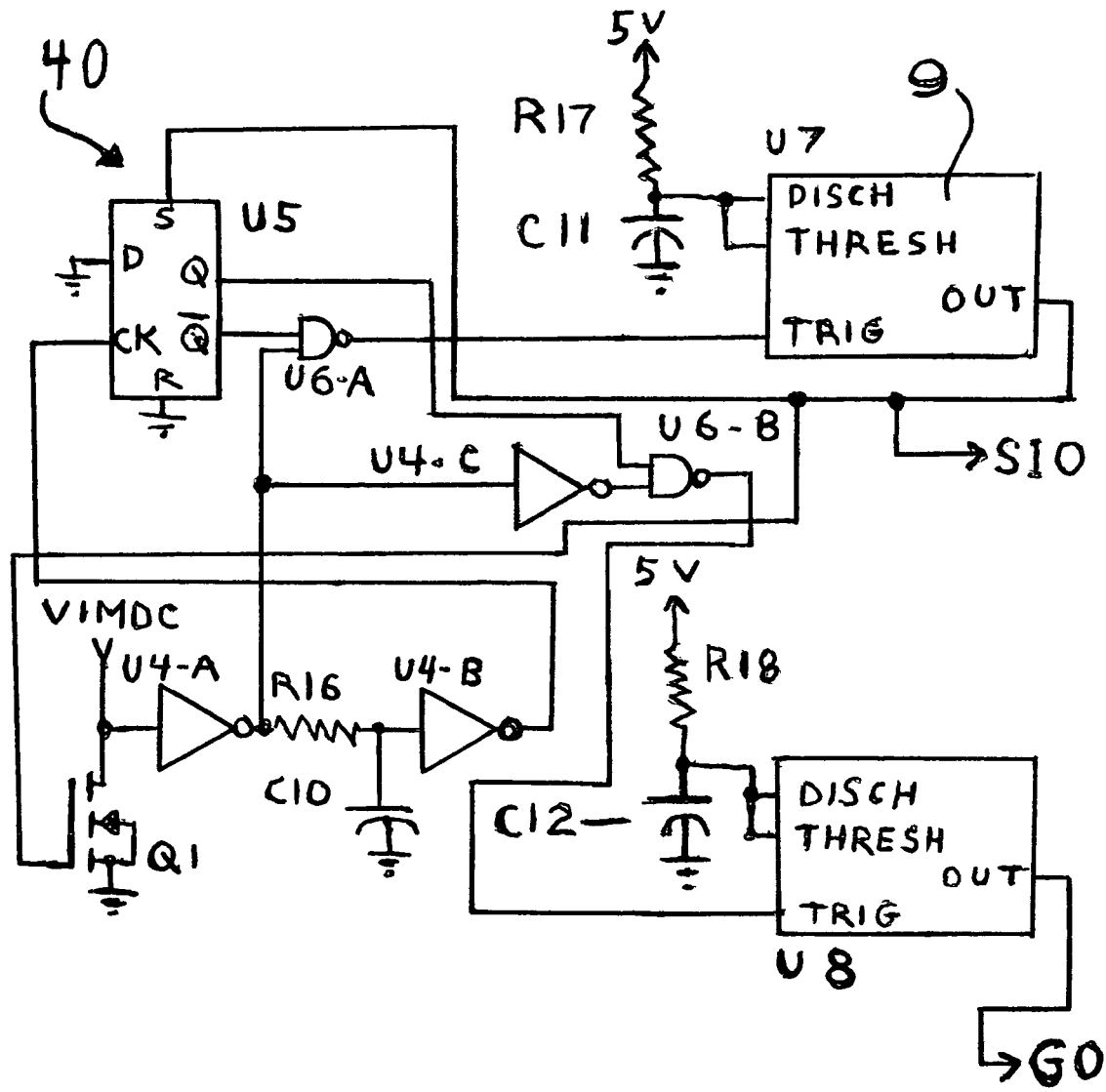
FIG. 5 shows a diagram of electrical circuitry of a sequence detector/indicator timer, in accordance with an embodiment of the present invention.

The fanout includes the SET input of U5-A and that high causes the Q NOT output to return to its quiescent low state. Signal SIO at the gate of MOSFET Q1 turns the device "on" and holds the input of U4-A low, and therefore the sequence detector portion of FIG. 5 is inoperative during the time when the stop indicator output is active or high which is a function of C11 charging to 66% of Vcc through R17, at which point the circuit of FIG. 5 will reset itself, waiting for the next start/stop cycle.

Figure 6:
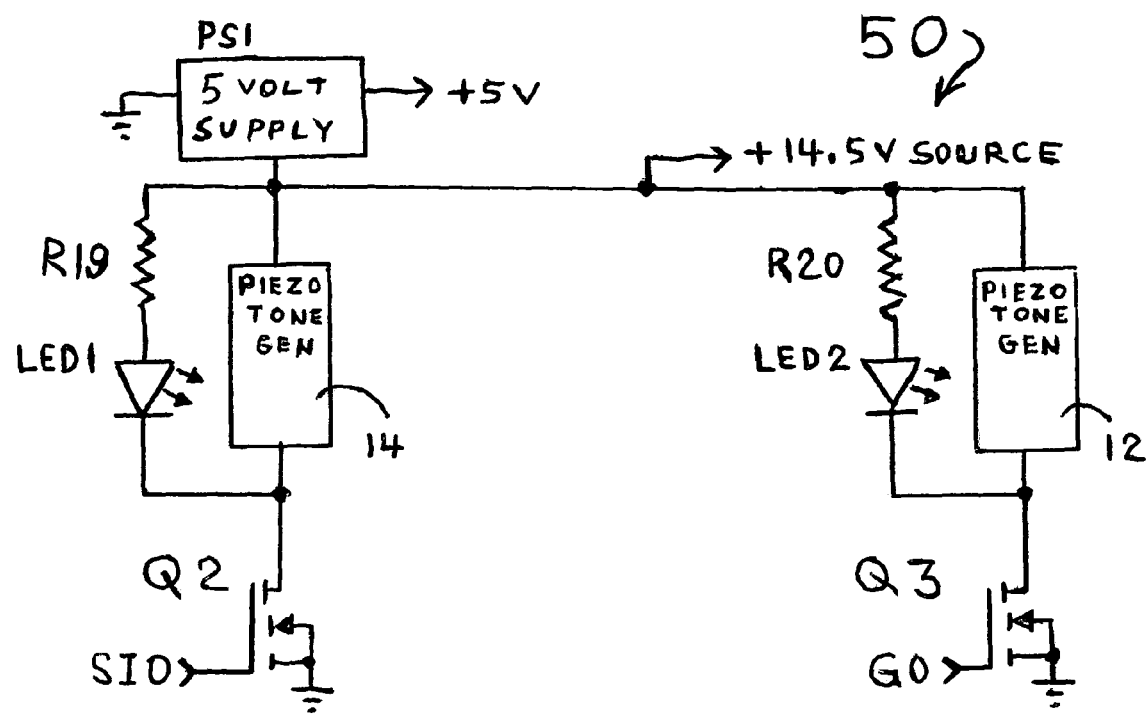
FIG. 6 shows a diagram of the electrical circuitry of an audio/visual annunciator and a 5 volt power supply, in accordance with an embodiment of the present invention.

Referring now to FIG. 6, shown is the circuitry of the annunciator 50 with its 5 volt power supply, in the embodiment shown the annunciator 50 is an audio/visual annunciator. When vehicle movement first occurs the timing cycle is initiated. Signal GO is applied to the gate of transistor Q3, LED 2 is connected to its drain. LED 2 is ballasted by R19 to operate at 14.5 volts. Also connected to Q3's drain is piezo audible tone generator 12, and is connected to operate from 14.5 volts. LED 2 flashes and the piezo audio tone generator 12 sounds during the period of time that signal GO is high. Signal SIO from timer device U7 is coupled to the gate of MOSFET transistor Q2. The drain element of the transistor is connected to the cathode of LED 1, which is a light emitting diode. The anode of LED 1 is ballasted by R18 to operate on 14.5 volt vehicle power. The piezo audio tone generator 14 connects between the drain of Q2 and 14.5 volt vehicle power. The LED 1 flashes and the piezo audible tone generator 14 sounds for the duration of time that signal SIO is high.

Through operation of the alert device 100 described above, the driver is alerted when vehicle motion initially occurs. Also, the task of perceiving the point of being stopped is no longer solely left to the subjective viewpoint of the operator of the vehicle. The operator is now free to concentrate on their surroundings. Such freedom of additional concentration is particularly important with vehicles, such as modern cars which are often equipped with high power sound systems and other accoutrements. Furthermore, after the motorist becomes acclimated to the device, it serves to help maintain driver alertness. This is because the vehicle operator will anticipate the notifications of the invention and lapse in attention will quickly be revealed. These multiple feedback functions from the alert device 100 promote a more in touch driver.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An alert for vehicles comprising:
   a sensor for detecting movement of a vehicle; and
   an annunciator operably connected, via wired connection, to the sensor, wherein the annunciator is controlled to produce an alert detectable to an operator of the vehicle immediately after the sensor detects movement of the vehicle has come to a complete stop.

2. The alert device of claim 1, wherein the alert is from a group consisting of an audio alert, a visual alert, and a tactile alert.

3. The alert device of claim 2, wherein a plurality of alerts are produced.

4. The alert device of claim 1, further comprising a receiver input/comparator/power supply operably connected to the sensor.

5. The alert device of claim 4, further comprising a monostable gate operably connected to the receiver input/comparator/power supply.

6. The alert device of claim 5, further comprising a gated astable multivibrator/rectifier/filter operably connected to the monostable gate.

7. The alert device of claim 6, further comprising a sequence detector/indicator/timer operably connected to the gated astable multivibrator/rectifier/filter.

8. The alert device of claim 7, further comprising an audio/visual/tactile annunciator operably connected to the sequence detector/indicator/timer.

9. An alert system comprising:
   a vehicle; and
   an alert device, wherein the alert device comprises;
   a sensor for detecting movement of a vehicle; and
   an annunciator operably connected, via wired connection, to the sensor, wherein the annunciator is controlled to produce an alert detectable to an operator of the vehicle immediately after the sensor detects movement of the vehicle has come to a complete stop.

10. The alert system of claim 9, wherein the annunciator produces another alert when vehicle movement initially occurs from a previously stopped position.

11. The alert system of claim 9, wherein the alert is from a group consisting of an audio alert and a tactile alert.

12. The alert system of claim 9, wherein a plurality of alerts are produced.

13. The alert system of claim 9, further comprising a receiver input/comparator/power supply operably connected to the sensor.

14. The alert system of claim 13, further comprising a monostable gate operably connected to the receiver input/comparator/power supply.

15. The alert system of claim 14, further comprising a gated astable multivibrator/rectifier/filter operably connected to the monostable gate.

16. The alert system of claim 15, further comprising a sequence detector/indicator/timer operably connected to the gated astable multivibrator/rectifier/filter.

17. The alert system of claim 16, further comprising an audio/visual/tactile annunciator operably connected to the sequence detector/indicator/timer.

* * * * *